July 17, 1956     A. J. TOTI     2,754,539
FOWL DEFEATHERING METHOD
Original Filed Sept. 7, 1951
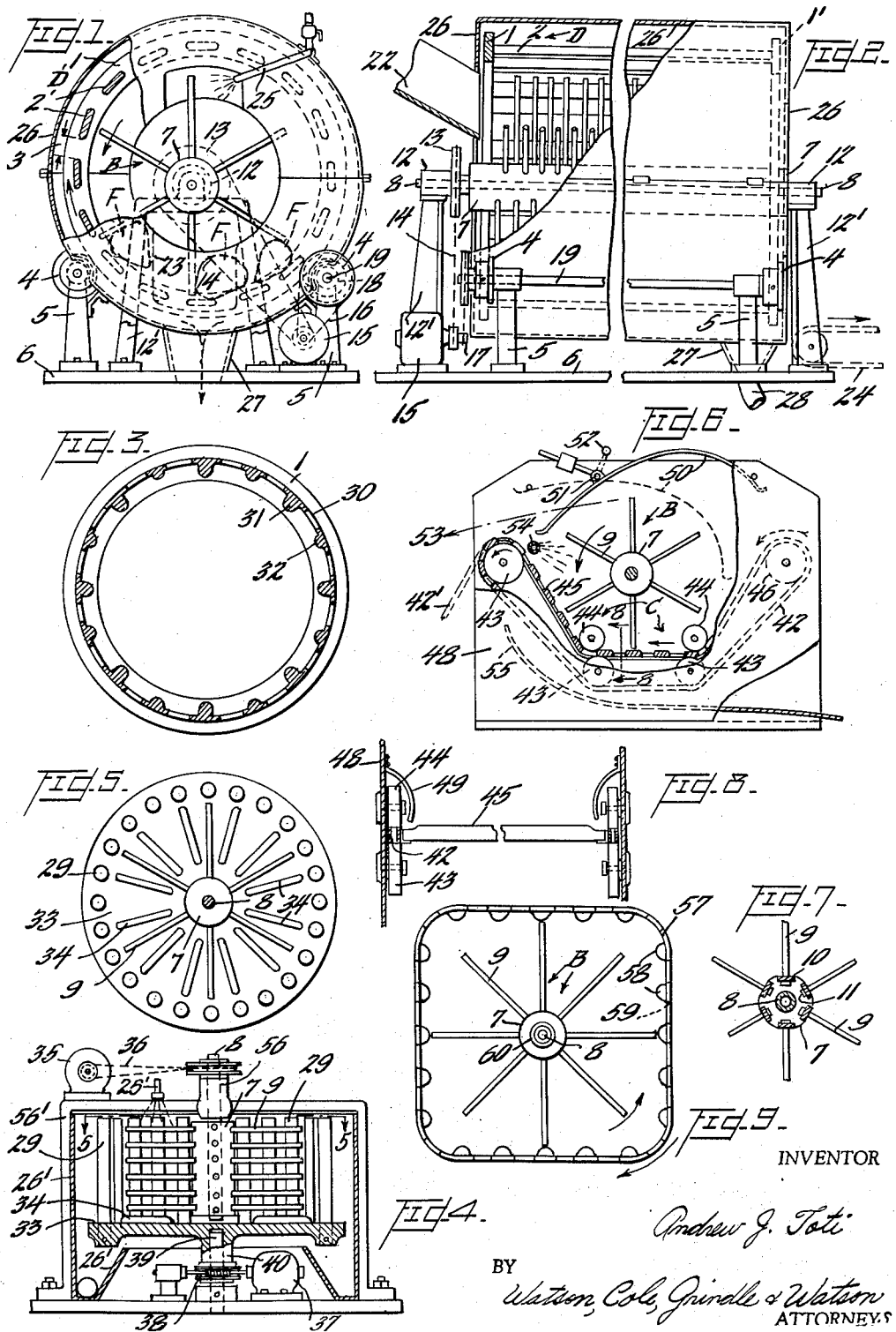
INVENTOR
Andrew J. Toti
BY Watson, Cole, Grindle & Watson
ATTORNEYS

United States Patent Office 2,754,539
Patented July 17, 1956

2,754,539

FOWL DEFEATHERING METHOD

Andrew J. Toti, Modesto, Calif., assignor to Honolulu Oil Corporation, a corporation of Delaware Original application September 7, 1951, Serial No. 245,571. Divided and this application April 11, 1956, Serial No. 577,476

12 Claims. (Cl. 17—45)

This application is a division of my United States patent application Serial No. 245,571, filed September 7, 1951.

This invention relates to a fowl defeathering method and has for its object improvements over prior methods used for this purpose, and contributing to more efficient action and lower cost. Other advantages and features of the invention and construction will appear in the following description and accompanying drawings.

In the drawings:

Fig. 1 is a front end view of a horizontal drum type of a defeathering machine made in accordance with my invention which, along with the others illustrated in the drawings, will carry out my improved method. Part of the forward end wall of the casing and forward bearing are broken away to reveal the beater and inner construction.

Fig. 2 is a side view of Fig. 1 with part of the side wall of the casing and drum broken away.

Fig. 3 is a sectional end view of a modified form of drum or cage.

Fig. 4 is a sectional side view of a vertical type of machine embodying the same invention.

Fig. 5 is a plan view of the drum and beater only of Fig. 4.

Fig. 6 is a side elevation of a conveyor type of machine with the forward side of the casing broken away embodying the same invention.

Fig. 7 is a detail of the beater core which may be used.

Fig. 8 is an enlarged cross sectional detail of Fig. 6 taken along the line 8—8 thereof.

Fig. 9 is an end view of a variation in form of the drum with beater in position.

Briefly described the invention includes tumbling the fowl about while whipping its feathered surface at all points with flexible beaters to remove the feathers. Conventional fowl defeathering beaters are employed and these perform, in the usual manner, by striking the fowl with more or less wiping or dragging frictional blows. The beaters being preferably of soft flexible rubber, natural or synthetic, or other flexible friction material such as leather, ropes, etc. but preferably of a rubber compound. The fowl are supported during the operation by a cradle or drum-like container, and preferably the fowl after first killing and draining of blood, are dipped in hot water, and water (preferably hot) is sprayed on the fowl and/or the beaters during the picking operation, though some fowl may be run through dry with good results.

In the "drum" type of machine shown in Figs. 1 and 2, the drum D is substantially horizontally disposed, being tilted slightly downward at the rear or discharge end to urge the fowl to the outlet end. The "drum" comprises two circular end rings 1 and 1' joined by longitudinally extending slats 2 spaced to leave substantial spaces 3 between them. These rings may be rotatably supported as by flanged rollers or wheels 4 at both ends carried by bearing stands 5 extending upward from a base frame 6. The structure described forms what may be more properly described as a cylindrical cage or cradle to receive the loose fowl, and while it is here shown with its "wall" made of spaced slats, it could be of round bars, or even heavy wire of elongated mesh with open spaces big enough to pass large fowl feathers. The "wall" may be of sheet metal, as indicated and described with respect to Figures 3 and 9, and may entirely surround the beaters as shown in Figures 1, 5 and 9, or may but partially embrace the beaters as shown in Figure 6. These wall means provide for maintaining the loose fowl adjacent the rotating beaters, also for guiding or carrying the fowl into the beaters for being struck thereby, and for retarding their bodily movement along by the beating while permitting them to tumble over during the operation, and the wall means may include ribs or baffles, as shown in Figures 3, 5 and 9 to further retard and tumble the fowl about.

The cylindrical rotary beater assembly B extends longitudinally within the drum and may comprise (see Fig. 7) a core 7 with shaft 8 and several rows of soft flexible beater members 9 extending radially from bars 10 forming part of the core, the beater members being headed at their inner ends 11, and passed through holes in the bars or in a plain cylindrical core if the bars are not used. The beater members 9 are preferably roughened or transversely grooved or ribbed exteriorly as well known in the art, and soft enough to all hang down when the beater core is not rotating but are indicated in the figures as extending radially (as though the beater were rotating) for clarity of the showing.

The beater shaft 8 is rotatably supported at opposite ends by bearings 12 on pedestals 12' extending from the base 6 and carries a driving sprocket or pulley 13 at one end driven by a belt or chain 14 from an electric motor 15 secured to the base. This motor may also rotate the drum D as by a short belt or chain drive 16 extended from a suitable pulley or sprocket 17 on the motor to a sprocket or pulley 18 on the shaft 19 of one pair of the rollers 4 at one side of the drum which are secured to the shaft to drive the drum by friction, though obviously a gear on the shaft may mesh with a rim gear secured to one end of the drum if desired, so that while the beater assemblage or rotor B is turning in the direction shown by the arrow in the drawing Fig. 1 the drum will be going in the opposite direction, also shown by an arrow, to tend to carry any loose fowl F lying at the bottom of the drum toward the left into contact with the oppositely moving beaters, or retard any fowl F descending on the incline at the left side of the drum between the beaters and the drum. Fowl on the right hand side of the drum will tend to fall back by gravity into the beating zone.

The fowl may be introduced at the front end of the drum as from a conveyor or chute 22, and preferably the drum is tilted slightly to cause the fowl to move toward the opposite or discharge end, as the drum rotates, and out of an opening at 23 in the rear end of the casing to fall onto a belt conveyor 24 to be carried to further processing. Instead of the whole machine being tilted slightly the drum may be slightly larger at the discharge end to produce the same effect.

A water spray pipe perforated for a distance is provided as at 25, or the beater shaft 8 may be hollow and also used for the water spray. It is preferable that the water used be hot, though not absolutely essential.

It is also desirable to surround the drum with a sheet metal casing 26 to intercept any water spray and also catch the feathers working and thrown through the wide slots between the slotted wall of the drum and guide them from the drum at the discharge end as at 27 and to a suction pipe as at 28. The angle of tilting of the drum and the length of the drum determines the time or duration of treatment of the fowl to secure the defeathering wanted.

Instead of the drum having a spaced slat wall as shown in Fig. 1 the wall may be round bars as shown in Fig. 5 and which may be of wood, metal, or either covered with rubber, as sections of a garden hose, or the drum wall may be a solid or perforated sheet 30 as indicated in Fig. 3 and provided with ribs extending lengthwise or slightly at an angle within, either all one size or staggered large 31 and small 32, or a plain wall covered with rough sheet rubber or other friction material will function to a degree.

The axis of the beater is preferably offset somewhat from the axis of the drum as shown in Fig. 1.

In the vertical "drum" machine shown in Figs. 4 and 5 as stated, the "slats" of Fig. 1 give way to round bars 29 and the flat bottom end 33 of the drum is preferably ribbed as at 34. In this type the beater rotor is made and numbered as given for Fig. 1 and rotated on a vertical shaft 8 as by an electric motor 35 belted to it as at 36 or otherwise arranged to drive it. The shaft 8 and beater are suspended from a bearing 56 carried on a spider frame 56'. The drum may be fixed, or it may be revolved in the opposite direction from the beater as explained for Fig. 1 as by a second motor 37 with worm drive 38 to a vertical hub 40 extending from the bottom of the drum, and which hub is rotatably supported on a fixed vertical shaft 39. The rapid or fast moving beaters, moving in one general direction within the confined space or zone provided by the drum, and striking the loose fowl placed therein, tend to cause the loose fowl to move along with the beaters and this bodily movement is guided by the drum or wall means, and also retarded whereby the fowl are tumbled about to expose all parts of the loose fowl to the action of the beaters, including under and over the wings, and neck, and between the legs. The bodily movement of the loose fowl is thus confined to a path which generally would follow that in which the beaters are moving. The retarding of the bodily movement of the loose fowl along with the beaters may be augmented to any degree by moving the wall means in opposite direction from that of the beaters. The arrangement of the wall means is such that the path in which bodily movement of the tumbling loose fowl progresses in the course of its defeathering extends about the axis of the rotating beaters, and in the type of machine shown in Figure 6, this path extends at least in part about the axis of the rotating beaters.

This design may also be provided with water spray pipe 25' and spray protective casing 26'. This style is more for small machines where the machine is stopped to remove the fowl.

In the design of Figs. 6 and 8 the support for the fowl is a perforated traveling belt or chains with cross slats generally of cradle form C and comprises a pair of endless chains 42 running over supporting and guiding sprockets or wheels 43, 44, the chains being fitted with the well known attachment links cross connected at spaced intervals with slats 45 corresponding to the slats 2 of Fig. 1. In Fig. 8 the arrangement of chains and slats is shown in cross section and it will be noted that sheet metal guard plates 49 cover the guide wheels 44 which are within the cradle. These plates are omitted from Fig. 6 for clarity.

The conveyor thus formed is driven from one pair of end sprockets 46 by any suitable drive (not shown) and the depressed central portion of the upper run of the conveyor forms a cradle in which the fowl are moved by the conveyor into contact with the beater arms 9 as explained for Fig. 1. The beater B is revolved by driving means (not shown), at a speed to make the beater arms travel faster than the conveyor, and the fowl dropped freely onto the conveyor are carried into contact with the beaters, or, if the fowl are dropped above the downward moving side of the beaters the conveyor ridges or slats will retard the downward movement of the fowl while the beaters aided by the special conveyor construction will tumble and turn the fowl about. The loose fowl are thus subjected to the action of the beaters while being urged or guided toward the beating zone and while tumbled about so the beaters will strike all parts of the loose fowl.

In operation the loose fowl is turned about in all directions and occasionally passes clear over the beaters B, so a suitable casing 48 is provided to form side walls for the apparatus, and between them is a curved guide plate 50 pivoted to a cross shaft 51 provided with a counterbalanced handle 52 for swinging the plate 50 from solid line to dotted line position, against the stops indicated and when in the latter position will discharge the picked fowl over the top of the beater B and out of the space as indicated by the dotted arrow 53 to fall on any suitable conveyor (not shown) or into a second beating compartment like the one shown, and with the conveyor extended to serve it also if desired and as indicated by the dotted lines 42'.

It should be noted that the operation of the guide plate 50 may be timed from the conveyor drive or separate timing drive, to operate at intervals to discharge the picked fowls.

A water spray pipe may also be used with the form of machine shown in Fig. 6 and such a pipe is indicated at 54, also any suitable water and feather discharge chute indicated at 55.

The form of drum shown in Fig. 9 is substantially rectangular or polygonal and may be of the spaced slat, round bar, or cage construction previously described but is here indicated as of sheet metal 57 with internal longitudinal ribs 58 either made integral or attached, and also with slots 59 to pass the feathers. This form is shown with the beater B mounted on the same central axis with the beater shaft 8, within hollow trunnion shafts 60 to rotatably support the drum at opposite ends, as from spiders not shown. The drum and beater are driven in opposite directions as explained for Fig. 1.

Of course the apparatus may be made in two or three sizes to better handle various sizes of fowl and other birds, but for the average chicken a slat drum of about 28 inches in diameter and slats spaced about 2¼ inches apart and beaters of about 27 inches diameter has been found satisfactory.

It should be noted that while wet picking generally gives the best results, some fowl may be satisfactorily run through the machine dry, and in such case air may be circulated through the machine to carry out the dry feathers, as is well known in removing light waste materials from machines.

As shown in the drawings, the illustrative machines consist essentially of two main elements in addition to driving means, namely the beater assembly and the wall means which may include baffles or ribs and the like, for continuously presenting the loose fowl to the action of the beaters, the wall means being arranged relatively to the beaters so that the loose fowl are free to move bodily in the general direction in which the beaters tend to move them, this movement being modified or diverted or simply directed by the wall means so as to continuously present the loose fowl to the beaters. Thus the loose fowl are struck by the beaters moving in one general direction, while the bodily movement of the fowl along with the beaters is guided and retarded by the wall means, (and generally aided by gravity) whereby the loose fowl are tumbled about and maintained in striking relation with the beaters during the defeathering operation. Expressed in more fundamental terms, the beaters, moving in a definite path, apply to the fowl a first force which tends to move the fowl bodily, and the wall means frictionally applies an opposing second force in a manner which guides the loose tumbling fowl in a path which generally follows some part of that defined by the moving beaters, and the bodily movement of the loose fowl may progress in either direction in the path, or they may not progress at all, depending on the relative magnitude of the force frictionally applied by the beaters and the force frictionally applied by the wall or confining means, as well as by gravity in some cases.

Having thus described my improvement in fowl defeathering process and some of the variations in equipment for carrying out the process or method, what I claim is:

1. A method of mechanically defeathering loose fowl which comprises mechanically striking the loose fowl with rapid, rotary frictional defeathering blows rotating about a vertical axis in a manner which tends to move the fowl bodily and which at least aids in causing the loose fowl to be tumbled about in all directions to receive the blows all over, including under and over the wings and between the legs, while confining the loose fowl to bodily movement in a path which at least partially extends about the axis of said blows and within the confines of which path the loose fowl are subjected to striking by said defeathering blows until the feathers are substantially all removed, and frictionally retarding the bodily movement of the loose fowl in said path, to thereby increase their exposure to said defeathering blows.

2. A method of mechanically defeathering loose fowl which comprises confining loose fowl within a substantially circular zone free for tumbling about therein, while subjecting the loose fowl to rapid, mechanical, frictional defeathering, rotary blows traveling in circular paths generally concentric with said zone in a manner which tends to move the loose fowl bodily circumferentially within said zone and tumble the loose fowl about in all directions to expose the loose fowl to receive the defeathering blows all over, including under and over the wings and between the legs until the feathers are substantially all removed.

3. A method of mechanically defeathering loose fowl which comprises mechanically striking loose fowl with fast rotary frictional defeathering blows while rapidly tumbling the loose fowl about in all directions to expose all parts of the loose fowl to said blows, including under and over the wings and between the legs, while moving the loose fowl bodily at least partially about the axis of rotation of the rotary blows and maintaining the loose fowl in striking relation with said blows until the feathers are substantially all removed.

4. A method of mechanically defeathering loose fowl which comprises mechanically striking loose fowl with fast rotary frictional defeathering blows rotating about an axis in a manner to move the loose fowl bodily and to tumble the loose fowl in every direction to expose the loose fowl to receive said blows all over, including under and over the wings and between the legs and confining the loose fowl to bodily movement in a path extending at least in part about the axis of rotation of said blows, while urging the fowl into striking relation with said blows as the fowl tend to be thrown away therefrom until the feathers are substantially all removed.

5. A method of mechanically defeathering loose fowl which includes the steps of confining the loose fowl to bodily movement in a path while free for tumbling about therein, mechanically striking the loose fowl repeatedly with rapid, frictional defeathering blows applied in the general direction in which said path extends in a manner which tends to move the loose fowl bodily along the path and which at least aids in causing the loose fowl to be tumbled about in all directions to receive the blows all over, including under and over the wings and between the legs, and continuing the application of the defeathering blows to the loose fowl within the confines of said path until the feathers are substantially all removed.

6. A method of mechanically defeathering the loose fowl as claimed in claim 5 which comprises applying hot water to the tumbling, loose fowl.

7. A mechanical method of defeathering fowl which comprises mechanically striking loose fowl in a confined space with rapid, frictional defeathering blows in a manner tumbling the loose fowl about in every direction within said space so that the blows reach every part of the fowl including over and under the wings and between the legs, while moving the fowl along bodily within said confined space in the general direction of the movement of the blows until the feathers are substantially all removed.

8. A mechanical method of defeathering fowl which comprises mechanically striking loose fowl in a confined space with rapid, frictional defeathering blows in a manner tumbling the loose fowl about in every direction within said space so that the blows reach every part of the fowl including over and under the wings and between the legs, while moving the fowl along bodily within said confined space in the general direction of the movement of the blows, while retarding the free bodily movement of the fowl within said space until the feathers are substantially all removed.

9. A method of mechanically defeathering fowl which comprises mechanically striking loose fowl with rapid defeathering blows moving in a definite path of travel and moving the loose fowl generally in the direction of the blows while tumbling the fowl about in a manner to receive the blows all over including under and over the wings and neck and between the legs, while guiding the loose fowl back into said blows as they tend to be thrown away therefrom until the feathers are substantially all removed.

10. A method of mechanically defeathering fowl which comprises mechanically striking loose fowl with rapid defeathering blows moving in a definite path of travel and moving the loose fowl generally along said path, while retarding their bodily movement and tumbling the fowl about in the path in a manner to receive the blows all over including under and over the wings and neck and between the legs until the feathers are substantially all removed.

11. A method of mechanically defeathering loose fowl which comprises mechanically striking the loose fowl with frictional defeathering blows rapidly moving about an upwardly extending axis in a manner causing the loose fowl to be tumbled about in all directions to receive the blows all over including under and over the wings and between the legs, while guiding bodily movement imparted to the fowl by said blows in a direction at least in part about said axis until the feathers are substantially all removed.

12. A method of mechanically defeathering loose fowl which includes establishing an operating zone in which the loose fowl are to be defeathered, applying a first force to the loose fowl within said zone by mechanically striking the loose fowl repeatedly with rapid, frictional defeathering blows in a maner which at least aids in tumbling the loose fowl about in all directions and which tends to move the loose fowl bodily within said operating zone in the general direction in which said blows are applied, applying a second force frictionally to said loose fowl by confining them in a manner which retains said loose fowl within said operating zone free to move bodily in the general direction in which said blows are applied and in the opposite direction, and which opposes the tendency of the loose fowl to move bodily as a result of the application of said first force, whereby according to the relative magnitude of said first and second forces bodily movement of the loose, tumbling fowl within said operating zone will not occur, or will progress in the said general direction in which said blows are applied, or will progress in the said opposite direction, until the feathers are substantially all removed.

References Cited in the file of this patent

UNITED STATES PATENTS

| | | |
|---|---|---|
| 1,096,038 | Kramer | May 12, 1914 |
| 2,472,468 | Digby | June 7, 1949 |